United States Patent [19]
Renie

[11] Patent Number: 5,576,838
[45] Date of Patent: Nov. 19, 1996

[54] PERSONAL VIDEO CAPTURE SYSTEM

[75] Inventor: Richard L. Renie, Henderson, Nev.

[73] Assignee: Renievision, Inc., Las Vegas, Nev.

[21] Appl. No.: 207,920

[22] Filed: Mar. 8, 1994

[51] Int. Cl.⁶ .................................................. H04N 5/76
[52] U.S. Cl. ............................................ 386/117; 386/46
[58] Field of Search .................................... 358/335, 311,
358/906; 348/143, 158, 159, 207; 360/33.1;
364/300

[56]  References Cited

U.S. PATENT DOCUMENTS

| | | | |
|---|---|---|---|
| 4,567,531 | 1/1986 | Tabata | 358/335 |
| 4,635,136 | 1/1987 | Ciampa et al. | 358/342 |
| 4,688,105 | 8/1987 | Bloch et al. | 358/335 |
| 4,789,907 | 12/1988 | Fischetti et al. | 360/33.1 |
| 4,965,673 | 10/1990 | Bozzo et al. | 358/335 |
| 5,021,880 | 6/1991 | Graves et al. | 358/138 |
| 5,087,980 | 2/1992 | Staffer | 358/335 |
| 5,093,716 | 3/1992 | Kondo et al. | 358/41 |
| 5,099,324 | 3/1992 | Abe | 558/108 |
| 5,227,892 | 7/1993 | Lince | 358/335 |
| 5,278,662 | 1/1994 | Womach et al. | 358/335 |

Primary Examiner—Tommy P. Chin
Assistant Examiner—Y. Lee
Attorney, Agent, or Firm—McCormick, Paulding & Huber

[57]  ABSTRACT

A personalized video system for acquiring video of an individual consumer as shot at an amusement park or the like and combining those images with standard, preshot video of rides or attractions. The system includes cameras for generating digital video signals of the consumer at several locations on the attraction which are marked by an identification processor with information identifying the particular attractions with the particular consumer and stored in memory. The identifying information and information as to which of several attractions have been frequented by an individual are input by means of a card to a controller. Upon receipt of signals indicating the consumer wishes to receive a completed video, the controller generates command signals for a video assembler to create the final video product inserting the personalized video signals as appropriate in a standard, preshot film.

10 Claims, 3 Drawing Sheets

PERSONAL VIDEO CAPTURE SYSTEM

TECHNICAL FIELD

The present invention relates to the preparation of video tapes and deals more particularly with a system for filming video images and integrating those images into a video tape containing both professionally shot video as well as standard video of an individual consumer.

BACKGROUND OF THE INVENTION

There are a variety of techniques available for preserving visual images ranging from professional film and television to home video and still cameras. However, average consumers are limited to the later. A large portion of a consumer's use of still and video cameras occurs during vacations and outings where efforts are made to capture the experiences of friends and family. Too often these efforts are unsatisfactory because the equipment and technique of the average consumer are severely constrained as compared to professionals. Some venues, such as certain amusement parks and national monuments, offer preshot films and still prints for sale.

A still photograph contains one or more individuals at a particularly memorable location or event. If the photograph is taken by the consumer, that person is often left out of the picture. If the photograph is taken by the amusement park at a predetermined site, the composition of the photograph is constrained. Moreover, the fee typically charged for such a photograph makes the purchase of more than a few cost-prohibitive. The still photograph captures only a moment in time, and does not reflect the majority of the consumer's experience.

A variation of still photography that has recently been marketed involves the use of a "blue screen" backdrop which allows the consumer to select a desired image to be edited onto the photograph's background. The use of a digital camera to take either an "action shot" or one with a "blue screen" background yields a higher resolution photograph. Again however, the final product is a still photograph. An "action shot" is one in which a still photograph is taken of one or more individuals on a ride, e.g. a roller coaster. This technique has the advantage of being more dynamic than the posed photograph.

Yet another method is the use of a moving film medium such as a home video tape camera. With the use of such a camera dynamic or full motion situations can be recorded. However, one of the consumers must operate the camera and is therefore not in the video. In addition, video tape cameras for home use have certain limitations and will not work in some situations, such as low-light environments. Moreover, there are some images that are just too difficult or impossible to capture, either because cameras are not allowed at a particular location or because it is not possible to film the desired image from the optimum location. An example is an image of a rider during a 360° loop on a roller coaster taken from the center of the loop.

As an alternative, some amusement parks have recently begun to sell full motion video tapes of a "typical" day at the park. However, these tapes involve only of actors or individuals unknown and unrelated to the consumer, and thus do not have any personalized images of the consumer incorporated in the tape.

No system exists in the prior art that allows for a combination of professional image recording and yet is personalized for each consumer. U.S. Pat. No. 4,635,136 to Ciampa et al. discloses a method and apparatus for storing a massive inventory of labeled images, for example, real-estate parcels in a city. Each visual image is taken with a video camera and stored in a memory device, such as a magnetic disk. The information is accessed from the magnetic disk, which is associated with a computer monitor to define a route to be followed with a video camera. The video camera scans the images and provides video signals in the order in which corresponding digital information is accessed. Each video image is labeled using the digital information corresponding to the television signals with the labeling information. Multiple frames of television signals are recorded on a video recorder. One frame is selected from the multiple frames and recorded on its own frame of the video disk record.

U.S. Pat. No. 4,567,531 to Tabata discloses a vertical interval signal and coding under SMPTE control of a signal having at least a video program portion with sequential fields separated by vertical intervals, and also having associated sequential field related identification code signals. A desired field related identification code is selected and at which coding of the program commences. Continuously reoccurring vertical interval code signals are generated at predetermined intervals corresponding to like intervals between groups of fields of the program signal. The identification code associated with that program signal is subsequently compared with the selected identification code. When the identification codes match, the composite video program signal is signal mixed with the vertical interval code signal in a timed relationship to insert the video interval code signal in corresponding vertical intervals of the program signal.

A master play-back unit retrieves a master video recording and its associated master time code. A slave play-back unit retrieves a slave audio recording and associated time code. A micro-processor scales the slave audio time code to produce a virtual slave time code so that the master time code and virtual slave time code are prepared to produce a virtual off-set to be maintained substantially constant to synchronize operation of the master and slave play-back units. The magnitude of the virtual off-set may be selected, as can a scaling factor to vary the retrieval speed of the slave play-back unit relative to the master play-back unit. Separate advancing of the master tape and slave tape may be effected by advancing the master tape to a required position and subsequently advancing the slave tape using the virtual off-set.

U.S. Pat. No. 5,099,234 to Abe discloses an apparatus for extracting and combining a changed region in an image corresponding to a moving object. An area to be monitored is picked up by a television camera. A television camera signal corresponding to the monitored area is converted into digital data in units of frame and stored in frame memories. The image data stored in frame memories are read out, and a changed region is extracted as an image of a moving object. The extracted moving object image includes a shadow image. However, only the moving object is extracted from the frame. The shadow image is removed.

U.S. Pat. No. 5,227,892 to Lince discloses a method and apparatus for identifying and selecting edit points in digital audio signals recorded on a record medium. The apparatus includes a random access memory for storing a reproduced segment of the digital audio signal and its associated time code signal. A monitor is included for displaying the image corresponding to the reproduced portion of the associated video signal, and a D/A converter for converting that part of the digital audio signal segment corresponding to the displayed image and read from the random access memory by reference to the stored time code for reproduction by a loud speaker. A video screen displays the wave form of the analog converted audio signal with a cursor to relate the wave form to the image displayed on the monitor. A register for recording the time code read from the random access memory and corresponding to a required audio edit point at which the cursor is then positioned is also included.

It would be advantageous to have a system to overcome the drawbacks of prior methods of recording the highlights of an average consumer's vacation or outing that allows for the incorporation of professional film services and equipment at a reasonable cost. The present system is drawn towards such an invention.

SUMMARY OF THE INVENTION

An object of the present invention is to provide a video system which is capable of incorporating video signals of an individual onto a video tape containing standard, preshot images.

Another object of the present invention is to provide a system of the forgoing type in which video signals of the individual are acquired from a plurality of cameras and are later incorporated into the video tape at selected locations therein.

Yet another object of the present invention is to provide a system of the foregoing type wherein video signals from a plurality of individuals are incorporated into a corresponding plurality of video tapes.

Another object of the present invention is to provide a system of the foregoing type wherein video signals are processed in digital form.

According to the present invention, a system for preparing a personalized video tape of an individual at a preselected location includes a camera for recording digital signals indicative of an image of the individual at a preselected location. There is an identification processor for combining the camera signals with correlation signals identifying the individual with the camera signals. A memory is provided for retrievably storing the correlated camera means signals. A controller presents to the memory control signals to output selected correlated camera signals and also presents to the identification processor the correlation signals in response to received individual information signals. There is an input reader for receiving signals from the individual containing identifying information and generating therefrom the individual information signals. A video storage device has stored signals corresponding to a standard video image of the preselected location without the individual. The present invention also includes a device for generating signals initiating tape assembly in response to initiation control signals from the controller and a video assembler for generating, in response to tape initiation signals, a personalized video tape including the standard video signals combined with correlated camera means signals retrieved from the memory means.

According to another aspect of the present invention, a system for preparing a database of signals for use in analysis of attractions frequented by consumers includes a camera for recording digital signals indicative of an image of an individual consumer at a preselected location and an identification processor for combining the camera signals with correlation signals identifying the individual with the camera signals. The correlation signals include signals indicative of the location configured in a plurality of location parameter fields. A memory is provided for retrievably storing the correlated camera signals as is a controller for presenting to the memory control signals to output selected correlated camera means and for presenting to the identification processor the correlation signals in response to received individual information signals. The system also includes an input reader for receiving signals from the individual containing identifying information configured in a plurality of individual parameter fields and generating therefrom the individual information signals. There is a compiler which, in response to control signals from the controller, generates a database of signals indicative of selected ones of the location and individual parameter fields from the individual information signals, the camera means signals and said correlation signals.

DETAILED DESCRIPTION OF THE PREFERRED EMBODIMENTS

Figure 1:
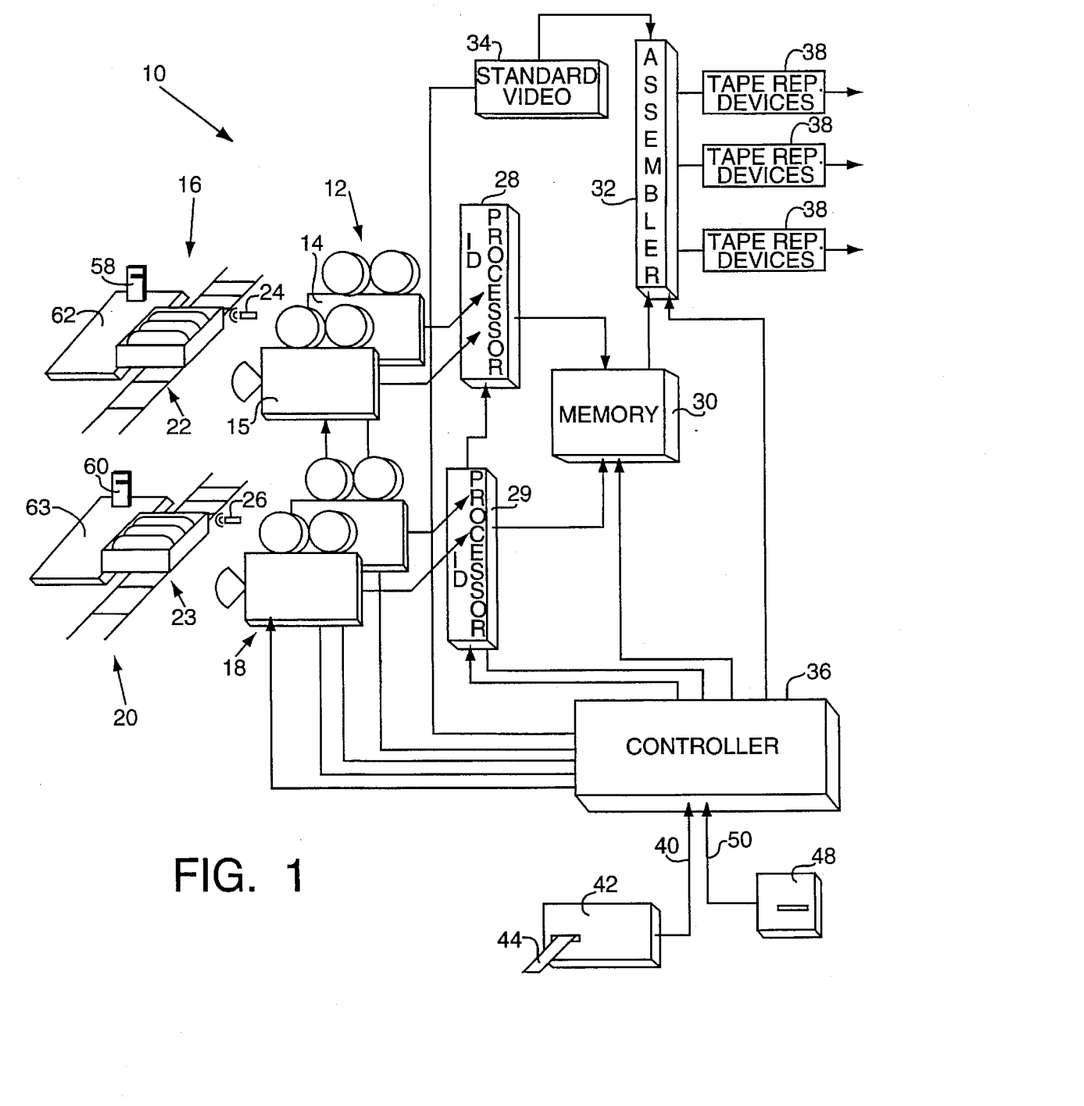
FIG. 1 is a simplified schematic illustration showing a portion of a personal video capture system provided in accordance with the present invention.

Turning now to FIG. 1, there is shown a personal video capture system 10 of the type marketed by the assignee of the present invention under the trademark "RenieVision". The system includes a plurality of video cameras 12 for capturing images denoted generally by the reference numerals 14, 15 preferably in digital signal form. The system is shown in the several Figures as adapted for use with an amusement ride 16, although those skilled in the art will note that the present system can readily be adapted to other venues.

The image is typically a dynamic or full motion image, but it may also be a static image. The system as illustrated includes a second plurality of cameras 18, 20 on a second ride 22. The cameras are activated upon receipt of enabling signals received by triggering devices 24 and 26, allowing the cameras to record an array of digital signals corresponding to an image sequence of preselected duration. More than one camera is preferably used per ride either at different locations or at different camera angles. Alternatively, a single camera can be used as mandated by the application. Each camera is strategically located to fully capture an experience, such as an individual's or family's day in an amusement park.

Digital image signals captured by each camera are transmitted to an identification processor 28, 29 for tagging as a sequence of image signals. These signals typically comprise less than 10 seconds of video. Numerous full-motion, video images of specific occurrences, e.g. an individual's experience on several amusement park rides, are recorded and stored during the course of the day. Information identifying the customer is acquired at the point of sale. In addition, the digital image signals may be compressed in a known manner prior to transmission of the information or otherwise prior to storage. The identification processor labels the digital image signals with identifying information as detailed hereinafter so that particular image sequence may be subsequently found and retrieved.

Associated with the identification processors is a memory 30 which receives identified image sequence signals for short term storage. The system also includes an assembler apparatus 32 that retrieves selected image sequence signals from the memory to be assembled with standard, preshot video signals stored in a separate memory apparatus 34. The standard video can be multiple video signals of separate, complete video sequences. The standard video in the preferred embodiment comprises an entire video of the features, attractions and rides within the park using actors in place of the those park patrons who purchase the product. Non-ride video opportunities with, for example, costumed theme-park characters at special locations around the park may also available. The present system gives patrons the opportunity to capture an adult or teen amusement park experience on the faster, more advanced rides, but also a child's amusement park experience on the kiddy rides and other children-oriented activities.

Upon receipt of command signals from a controller 36, the assembler composes a personalized video by overlaying the stored image sequence signals onto the preshot video as appropriate, yielding a video having both preshot and actual images of the consumer in a personalized video. In the preferred embodiment, the preshot video signals are stored in analog format and, a D/A converter (not shown) is employed for converting the digital image signals into an analog format. Tape replicating devices 38 are used to generate the final product for presentation to each of the consumers.

Figure 2:
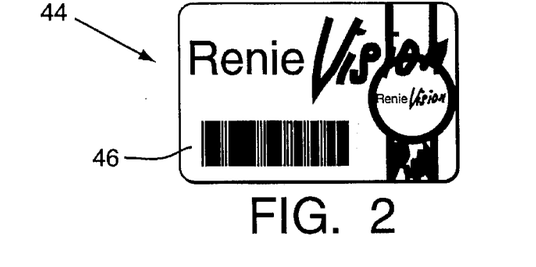
FIG. 2 is a simplified illustration of a consumer card used with the system of FIG. 1.

Activation of the system is accomplished by control signals provided on lines 40 from an input signal apparatus 42. The information input includes personal information on the consumer as well as information on the rides and selected options. In the preferred embodiment, the consumer is issued a card 44 on which is a bar code (46, FIG. 2) containing the pertinent data needed by the consumer. At the end of the day after the last ride has been completed, the person holding the card inserts the same into a card reader 48 and generates an end of day signal presented on lines 50 to the controller. In response, the controller generates command signals to begin the tape assembly process.

Figure 3:
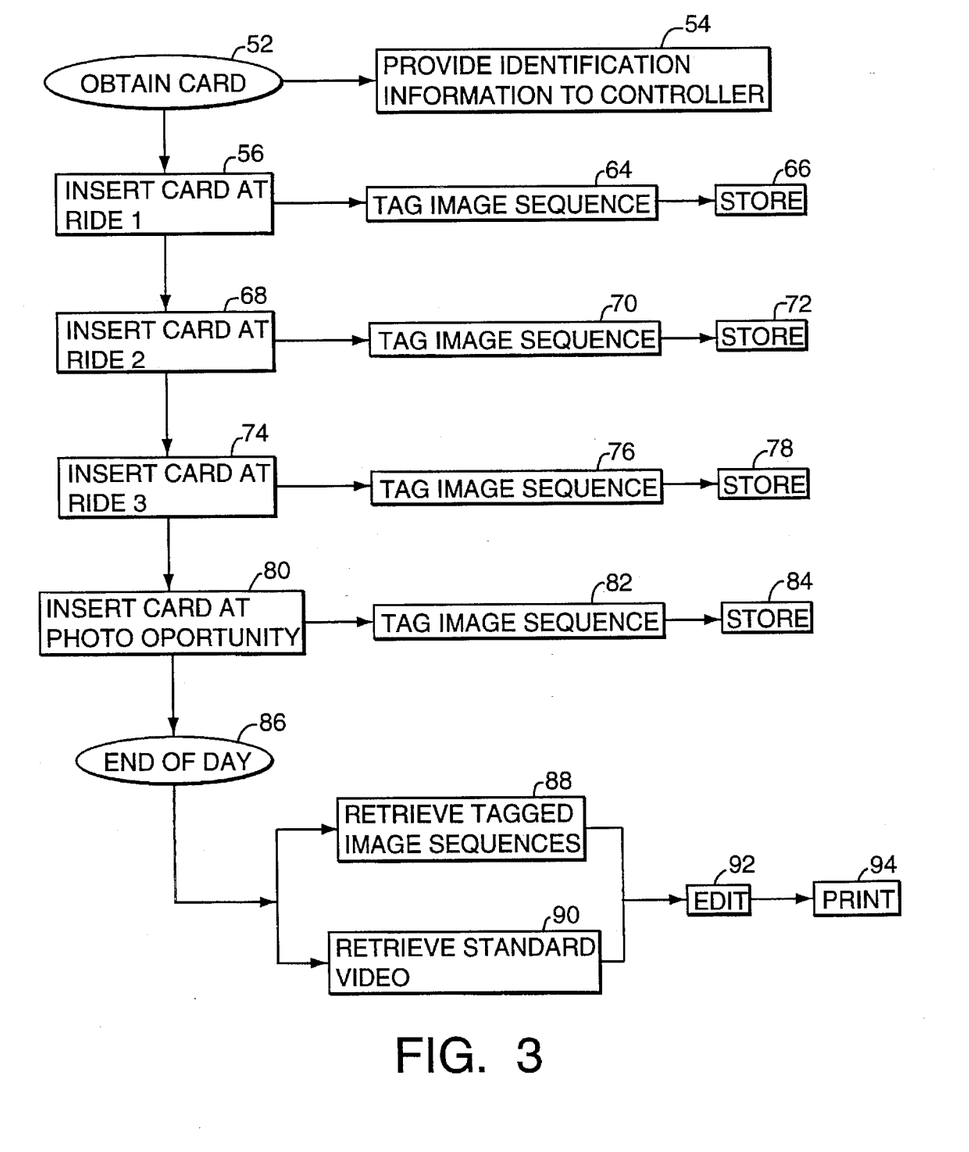
FIG. 3 is a diagrammatic representation of an image assembly process employed by the system of FIG. 1

To more clearly understand the present system, consider the present example of a day at a theme park illustrated in FIG. 3. Those patrons who choose to purchase the personalized video product pay for it in full and are then issued a special "ticket" with their park admission at the gate (block 52). The ticket is approximately 4×8 inches in size in the preferred embodiment. A special, plastic (e.g., key shaped) customer card is affixed to the top portion of the ticket. The card is of the type marketed by the assignee of the present invention under the trademark "VideoCard".

Both the ticket and plastic card are equipped with a corresponding bar code or equivalent identifying number supplied to the controller at block 54. Booths are located within the park for patrons who decide to purchase the product after entry. The information which is encoded on the customer card includes a code for each individual card, month, day and year as well as a sequential number used to insure that no two cards are identical. The parameter information specified in the system, such as the park code, can allow certain embodiments of the present invention to allow for customer cards to be used at several parks, if desired. There is also a special event code used so that corporations or organizations who rented a park and arranged for a special event, production can be properly tracked. By using the special event code it is possible to route incoming video events to specific tape decks for inclusion to a custom video tape while, at the same time, making the system accessible to regular clients as well.

Once inside the park, the patron removes the plastic customer card that is attached to the ticket. Simple multi-lingual instructions printed on both the ticket and the reverse side of the plastic customer card instruct the patron on the operation of the system and proper use of the customer card. The customer card may also equipped with a wrist strap or similar attachment device to ensure it is not easily lost. While entering any one of the several rides/attractions that are equipped with the present system, a consumer simply inserts, at block 56, his customer card into a standard, well identified bar code reading device located at the point just before stepping into a ride vehicle. See FIG. 1, reference numerals 58, 60 on the two rides shown. Alternatively, the bar code reading devices can be installed inside the ride vehicles where the patron inserts his card into the card reader immediately after he or she sits down in the vehicle. Also, ride operators remind patrons to insert their cards before ride vehicles leave boarding area 62, 63. In the preferred embodiment a small green light mounted on the reader tells the patron that the customer card has been successfully read.

Inserting the customer card into a bar code reading device instructs the controller to record that individual's specific car-number location on that specific ride (block 64) and store the corresponding camera signals (block 66). As the ride vehicle moves along its track or path, a triggering device, preferably an infrared sensor, identifies and counts ride vehicles. Breaking the beam of the infrared sensor also triggers the video camera positioned just ahead to start recording. The controller keeps track of patrons individually identified by number through their assigned customer card as they move freely around the park. As detailed herein, the customer cards allow the system to eventually link that specific patron with a list of camera sequence occurrences captured at specific rides and park locations throughout the day at other rides (blocks 68–78).

For a roller coaster-type ride where passenger cars are connected, the entire chain is photographed as it passes the camera. In addition, special effects (e.g., slow-motion while hurling through a 360-degree loop) can be added. The process is also employed at selected photo opportunity locations. For example, animal exhibits or other displays having a bar code reading device provides instructions (block 80) to the individual as to where to look and move while the camera photographs the person as they enjoy the exhibit. The image sequence is tagged and stored as above (blocks 82, 84).

The cameras do not move in the preferred embodiment, although camera movement can be accomplished, for example, by installing cameras on the actual ride vehicles themselves in a way similar to that utilized on race cars. In the system shown in FIG. 1, the ride vehicles simply move into and out of the field of view of the cameras. Each camera is positioned to capture approximately a 6–10 second image sequence per ride. Multiple 6–10 second, personalized sequences are then later retrieved by the Controller and used to assemble the final product. Multiple sequences on multiple rides attractions are captured, logged, and stored in the manner described above.

At the end of the day or as explained in the instructions printed on the ticket, at some time before planning to leave the park the patron inserts the customer card into a special, well-identified "end-production" bar code reader (block 86) which alerts the Controller to begin assembling that particular patron's personalized videotape. Alternatively, the controller automatically starts the assembling process directly after the maximum number of allowed personalized segments is reached.

The controller retrieves the tagged image sequences (block 88) as well as the standard video signals (block 90). The standard video contains stock footage of the amusement park as above. The tagged image sequences are copied and edited (block 92) onto the video tape in the appropriate location to create a composite video that is then printed at block 94. For example, an individual's experience on a roller coaster would be copied over or otherwise replace existing, stock footage of the roller coaster in action at several points along the ride. In the alternative, the stock footage may be stored digitally, with the stored images of the customer either inserted at or replacing corresponding sections of the stock footage while both are in digital form before conversion to video tape format.

The system does not photograph individual patrons. Rather, the separate vehicle with all its passengers are photographed, whether or not they are together. For example, two or more patrons holding different customer cards but sitting next to each other on the same ride will be in the same image sequence for each camera on that particular ride. It is highly unlikely that these same two unrelated individuals will be in adjacent seats on another ride. At the end of the day, when these patrons pick up their finished tape, they will each simply have the same personalized sequence on that particular portion of their 30-minute video program.

Figure 4:
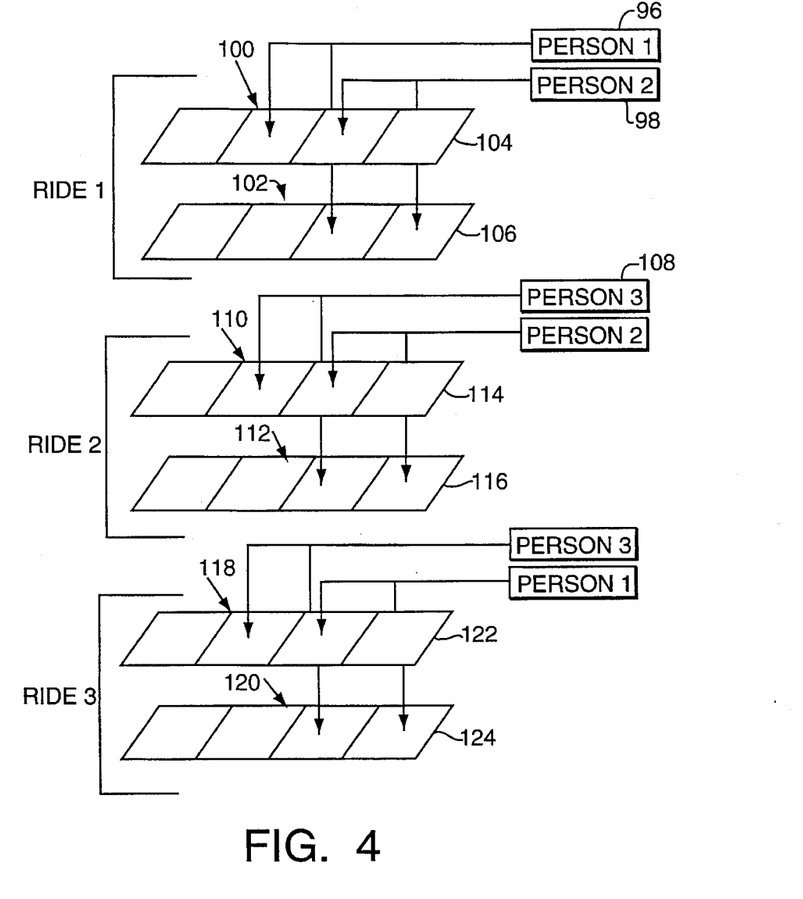
FIG. 4 is a second diagrammatic representation of the assembly process of FIG. 3.
Figure 5:
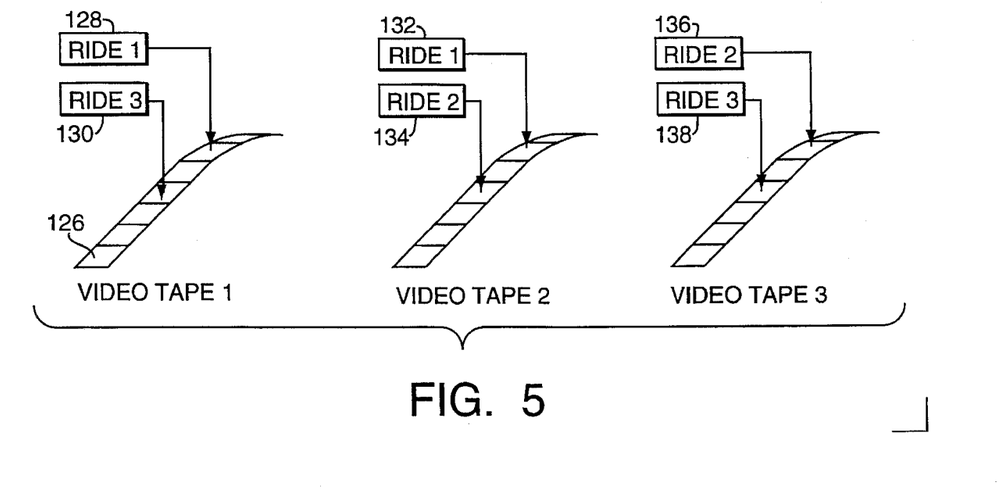
FIG. 5 is a simplified illustration of an algorithm executed by the system of FIG. 1.

An illustration is seen by way of reference to FIGS. 4 and 5. Assume that three individuals purchase the product as described above and are issued three corresponding customer cards. Persons 1 and 2 (blocks 96, 98) enter the first ride and are seated in separate cars and appear on separate video image sequences 100, 102 in camera signals 104, 106. Person 3 (block 108) and person 2 enjoy ride 2 while person 1 declines. Consequently, video image sequences 110, 112 in camera signals 114, 116 are tagged by the identification processor accordingly. The same is true for ride three where person 2 now refrains. Video image sequences 118, 120 in camera signals 122, 124 are tagged by the identification processor to reflect this permutation.

The assembly process is a matter of the controller retrieving and linking the patron's ride location and ride position information to the infrared-triggered, ride-cycle, camera-sequence occurrences of the video footage shot throughout the day and identified by the identification processor with video time-code. The controller interrogates a list of all a patron's rides, retrieves the linked footage, and then combines the individual's signal sequences with the standard tape to generate a personalized tape that is a composite of both. As shown in FIG. 5, a standard tape 126 forms the basis for three video tapes, one for each person. Video tape 1 is assembled from the images from rides 1 and 3 (blocks 128, 130) containing the first person, while video tapes 2 and 3 contains the images of persons 2 and 3, respectively (blocks 132–138).

Those skilled in the art will observe that the only signals actually being written to tape are the personalized segments in the appropriate locations. With high capacity, commercially available video tape recorders, 4–5 minutes of personalized footage (6–10 seconds on each of 10–15 rides) can be written to tape in 10–15 minutes. This estimate includes the time needed for the controller to shuttle through the tape, laying down the brief, personalized segments (6–10 seconds per ride), one after the other, according to the pre-assigned time-code and pre-arranged editing program.

Note that the order in which patrons go on the rides is of no consequence. The controller retrieves the personalized footage and automatically assembles the composite tape in accordance with the order in which the sequences are arranged on the standard tape. Since a standard tape is used as a basis, there are no dropouts or blank spaces on the tape reserved for the personalized segments should a person skip a ride. Rather, the personalized segments are copied over or on top of existing stock footage of that particular ride. If a patron skips a ride, his tape will still be complete, as there simply will not be any personalized footage seen on that particular ride. Since high-end, frame-accurate HS decks and time-code are used in the preferred embodiment, the editing and inserting of the personalized segments are clean and professional. The personalized sequences, all routed, contained, and catalogued according to time-code on multiple, terabytesize hard disks, are located by the controller, output from that hard disk and inserted onto the exact section of the tape containing the stock footage of the same attraction or ride in order to maximize the overall effect. A professional, high-quality video program is created for patrons to take home and share with friends and relatives when the personalized segments are combined and intercut with the pre-recorded stock footage of the same rides or attractions as well as any other stock material on the tape such as special events, parades, firework shows, etc.

Upon completion of the editing and inserting of the personalized segments onto the pre-recorded tapes, a VHS video tape recorder automatically rewinds and ejects the tape. At the same time, the controller produces a personalized label by means of a laser printer or equivalent. An on-site concession worker affixes the label to the right tape, and then exchanges the finished product for the patron's customer card. Afterwards, the customer cards are destroyed by park personnel, or cancelled out by the computer and reused in some embodiments. If the patron wishes, the finished videotape can be delivered later to their hotel room if they are staying at a nearby hotel. Similarly, special arrangements with nearby hotels can be made so that hotel guests planning to attend the nearby theme park could complete financial arrangements at their hotel, instead of at the park entrance gate. Finished videotapes can also be mailed to the patron's home address for an additional fee. If desired, duplicates of personalized videotape can also be purchased and sent as "video postcards" or gifts to friends and relatives anywhere in the world.

The present system as described in the preferred embodiment contemplates the use of large numbers of components in a fully-operational system in the theme park, such as Disney World. Consequently, the elements which comprise the preferred embodiment must be quite robust to handle the large amounts of data which would be generated as well as control the possibly hundreds of cameras, VCR's, etc.. The following are exemplary hardware used in such a system. Those skilled in the art will note that other equivalent componentry can be substituted in the preferred embodiment as well as in other embodiments which are adapted to a particular park or attraction.

The preferred controller is a Silicon Graphics brand Challenge XL model computer which is capable of handling multiple digital video signal outputs and inputs simultaneously. The Silicon Graphics computer also contains circuitry which is configured to perform the functions of the identification processor The system is preferably configured to use a UNIX operating system. Data signals from the camera are transmitted over conventional cables or wireless transmissions.

The camera used in the preferred embodiment is a Sony DXC-930 3 CCD cover video camera using a VCL-716 BXEA lens. There is a CMA-D1 power adapter, as well as a CCDC-10 DC power cable. Control and data signals are transmitted via a CCXC-9 DD 9-pin video cable. The video cards affixed to the video cameras for processing the digital signals are typically fast SCSI2 type cards such as Sirius/Galileo cards. A variety of data compression formats can be used. The system may also comprise a monitor for each of the rides so that the system operators may monitor the cameras and make adjustments to focus, zoom, etc. as desired. In addition to standard audio input, the system may include microphones configured to directly capture the individual's excitement and reactions during and after the ride.

In the preferred embodiment a fully digital video may be too slow for some applications. Consequently, the preferred embodiment anticipates a configuration in which 3–4 minutes of personalized video segments are digitized as opposed to, for example, an entire 30 minute program. Known tape editing systems having time code edit with roll forward/reverse, on the fly and "splice" operations can be accomplished in pre-recorded tapes with this configuration. The present system also provides for on demand video editing of the original program if, for example, there is a new attraction requiring insertion of appropriate footage. The video format is also flexible, and includes VHS and Beta format used in certain countries as well as NTSC as used in U.S.A. and Japan, PAL as used in Europe and most of the rest of the world, and SEACAM as used in France. Also, other signal formats (e.g., laserdisc, CD and 8-mm) can be readily adopted. Other exemplary hardware used in the preferred embodiment include a SR11 Data Logic slot scanner and a DPS 8000 Data Logic wedge decoder used in the reading of the bar codes contained on the customer cards.

Similarly, although the invention has been shown and described with respect to a preferred embodiment thereof, it will be understood by those skilled in the art that various changes omissions and additions thereto maybe made therein without departing from the spirit and scope of the present invention. For example, the present system also includes an embodiment in which a processor receives signals from the controller which identify which of the attractions the patrons have each been frequenting and compiles the same along with other pertinent information such as the date and time of day. This information can be combined with other bibliographic information on the individual consumer to yield important information about the parks' customers.

As an example, traffic flow between rides can be monitored as can the order in which the rides are taken. Customer preferences as to which attractions are favored are readily ascertained. When combined with consumer information such as demographics, more effective advertising can be implemented. The video of the consumers can also be monitored directly to provide feedback to management on personal responses, e.g., the reaction of children. The park can modify a ride in some respect, such as by adjusting the level of intensity of a ride in order to provide a more pleasant experience.

What is claimed is:

1. A system that records an image of an individual at a preselected location and retrievably stores digital signals of the image for preparing a personalized video tape, the system comprising:

a camera means including a plurality of video camera at each of a plurality of video locations for providing digital camera means signals indicative of the image of the individual at the preselected location;

an identification processor for combining said digital camera means signals from said plurality of video camera means with correlation signals identifying the individual and corresponding video camera location, and generating correlated camera means signals;

a memory means for retrievably storing the correlated camera means signals;

a controller for presenting to said memory means, in response to received tape assembly signals, control signals to retrieve selected correlated camera means signals and for presenting to said identification processor said correlation signals in response to received individual information signals and further for generating tape initiating signals to begin personalized video tape assembly;

an input reader means for receiving signals from the individual containing identifying information and generating therefrom said individual information signals;

video storage means having stored therein signals corresponding to a standard video image of said preselected location without the individual;

a means for generating said tape assembly signals for initiating tape assembly and identifying selected correlated camera means signals; and a video assembly means for generating, in response to said tape initiation signals, a personalized video tape including said standard video signals combined with said selected correlated camera means signals.

2. The system according to claim 1 further comprising an editor means for transferring said selected correlated camera means signals from said memory means onto a selected location in said personalized video tape.

3. The system according to claim 1 wherein said identification processor further comprises a means for generating individual correlation signals for associating received camera means signals with a one of a corresponding plurality of individuals and wherein said video assembly means further comprises a video means for generating, in response to said tape initiation signal, a plurality of said personalized video tapes, each of said tapes corresponding to a respective one of said individuals.

4. The system according to claim 1 wherein said camera means further comprises a video camera moveable about a video location.

5. The system according to claim 1 wherein said camera means further comprises a video camera providing camera signals in digital form.

6. A system that asynchronously records an image of an individual at a preselected location and retrievably stores digital signals of the image for preparing a personalized video tape, the system comprising:

a camera means for asynchronously providing digital camera means signals indicative of the image of the individual at the preselected location;

an identification processor for combining said digital camera means signals with correlation signals identifying the individual with said camera means signals and generating correlated camera means signals, said identification processor further comprises a means for generating individual correlation signals for associating received camera means signals with a one of a corresponding plurality of individuals;

a memory means for retrievably storing the correlated camera means signals;

a controller for presenting to said memory means, in response to received tape assembly signals, control signals to retrieve selected correlated camera means signals and for presenting to said identification processor said correlation signals in response to received individual information signals and further for generating tape initiating signals to begin personalized video tape assembly;

an input reader means for receiving signals from the individual containing identifying information and generating therefrom said individual information signals;

video storage means having stored therein standard video signals corresponding to a standard video image of said preselected location without the individual;

a means for generating said tape assembly signals for initiating tape assembly and identifying selected correlated camera means signals; and a video assembly means for generating, in response to said tape initiation signals, a plurality of personalized video tape including said standard video signals asynchronously combined with said selected correlated camera means signals, each of said tapes corresponding to a respective one of said individuals.

7. The system according to claim 1 further comprising an editor means for transferring said selected correlated camera means signals from said memory means onto a selected location in said personalized video tape.

8. The system according to claim 1 wherein said identification processor further comprises a means for associating camera means signal from a plurality of cameras with the individual.

9. The system according to claim 1 wherein said camera means further comprises at least one video camera at each of a plurality of video locations, said identification processor further comprises a means for linking camera means signals received from each of the video cameras with its corresponding video camera location.

10. The system according to claim 1 wherein said camera means further comprises a video camera providing camera signals in digital form.

\* \* \* \* \*

UNITED STATES PATENT AND TRADEMARK OFFICE
CERTIFICATE OF CORRECTION

PATENT NO. : 5,576,838
DATED : November 19, 1996
INVENTOR(S) : Richard L. Renie

Page 1 of 2

It is certified that error appears in the above-indentified patent and that said Letters Patent is hereby corrected as shown below:

Column 1, line 2 and on the title page:

Item [54]: After "SYSTEM", please insert --OF ASYNCHRONOUSLY RECORDED IMAGE OF AN INDIVIDUAL--.

Column 10

On line 27, please delete "therein signals" and substitute --therein standard video signals--.

Column 11

On line 1, please delete "1" and substitute --6--.

Column 12,

On line 11, please delete "1" and substitute --6--.

UNITED STATES PATENT AND TRADEMARK OFFICE
CERTIFICATE OF CORRECTION

PATENT NO. : 5,576,838
DATED : November 19, 1996
INVENTOR(S) : Richard L. Renie

It is certified that error appears in the above-indentified patent and that said Letters Patent is hereby corrected as shown below:

Column 12

On line 15, please delete "1" and substitute --6--.

Column 12

On line 21, please delete "1" and substitute --6--.

Signed and Sealed this

Eighth Day of April, 1997

*Attest:*

BRUCE LEHMAN

*Attesting Officer*     *Commissioner of Patents and Trademarks*